P. E. ERICKSON.
LUBRICATOR FOR LEAF SPRINGS.
APPLICATION FILED FEB. 10, 1914.
1,156,070.
Patented Oct. 12, 1915.
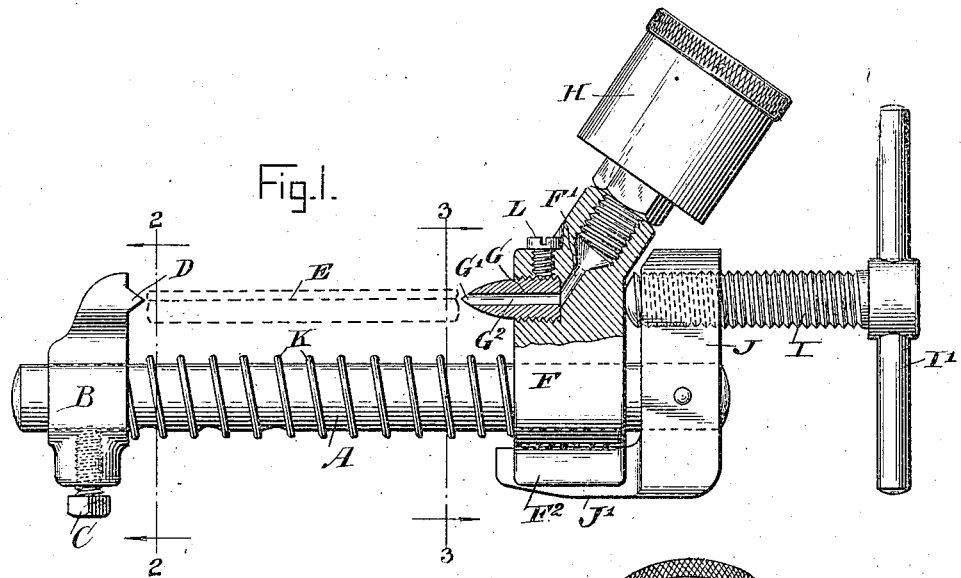
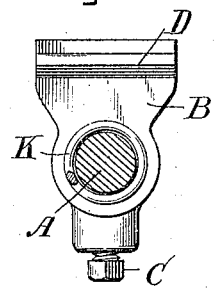
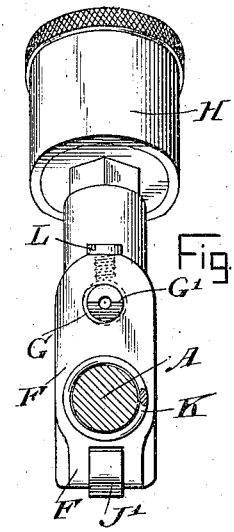
WITNESSES
INVENTOR
Peter E. Erickson
BY
ATTORNEYS

UNITED STATES PATENT OFFICE.

PETER E. ERICKSON, OF PORT CHESTER, NEW YORK.

LUBRICATOR FOR LEAF-SPRINGS.

1,156,070.  Specification of Letters Patent.  Patented Oct. 12, 1915.

Application filed February 10, 1914. Serial No. 817,786.

*To all whom it may concern:*

Be it known that I, PETER E. ERICKSON, a citizen of the United States, and a resident of Port Chester, in the county of Westchester and State of New York, have invented a new and Improved Lubricator for Leaf-Springs, of which the following is a full, clear, and exact description.

The object of the invention is to provide a new and improved lubricating device for lubricating leaf springs of automobiles and other vehicles to prevent such springs from squeaking and to reduce the wear thereof to a minimum. In order to accomplish the desired result, use is made of means for prying adjacent leaves apart and passing a lubricant between the pried open leaves.

Figure 1 is a side elevation of the lubricating device as applied, parts being shown in section; Fig. 2 is a transverse section of the same on the line 2—2 of Fig. 1; and Fig. 3 is a similar view of the same on the line 3—3 of Fig. 1.

The lubricating device is mounted on a support A, preferably in the form of a rod or bar, on one end of which is adjustably secured a spreading member B by the use of a set screw C. The spreading member B is provided on its inner face with a transversely-extending V-shaped lip D adapted to pass between adjacent leaves of a leaf spring E at one side thereof, as plainly indicated in Fig. 1. On the supporting bar A is mounted to slide a prying member F provided with a tubular or hollow prying point G having a transversely-extending V-shaped lip G' located directly opposite the prying lip D to pass between the adjacent leaves of the leaf spring E at the opposite sides thereof, as will be readily understood by reference to Fig. 1. The opening G² in the point G is in communication with an aperture F' formed in the member F and in communication with the interior of a container H for containing the lubricant.

In order to move the prying member F and its point G toward the other prying member B, use is made of a screw rod I screwing in a nut J secured to the supporting bar A adjacent the prying member F, the said screw rod I abutting against the back of the prying member F so that when the handle I' of the screw rod I is turned, the said prying member F is moved toward the prying member B to cause the lips D and G' to pass between adjacent leaves with a view to pry the same open. In order to hold the member F against turning on the support A, use is made of a guide rod J' extending from the bottom of the nut J and engaging a guideway F² formed on the bottom of the movable prying member F. A spring K is coiled on the support A and presses with one end on the prying member B and presses with its other end the prying member F so that when the screw rod I is retracted, the spring moves the prying member F outward to disengage the lips D and G' from the previously pried open leaves of the spring I. The point G is preferably screwed in the prying member F and secured therein by a set screw L to permit of conveniently removing the said point G for replacement by a new one in case it is worn out.

In using the lubricating device the screw rod I is retracted so that the lips D and G' are a distance apart somewhat in excess of the width of the spring E to allow of placing the edges of the lips D and G' at the joint between the adjacent leaves of the spring E, and then the screw rod I is screwed up so as to move the member F toward the member B and in doing so the lips D and G' pass between the two adjacent leaves to pry the same open. When this position is reached the operator screws up the cover of the container H to force some of the lubricant out of the container and by way of the apertures F' and G² between the pried open leaves of the spring E. The operator next retracts the screw rod I so that the member F is returned to its former position by the action of the spring K, whereby the lips D and G' are disengaged from between the leaves of the spring E to allow the said leaves to return by their own resiliency with the lubricant interposed between the said leaves, thus lubricating the same.

From the foregoing it will be seen that a very simple tool is provided for conveniently spreading the members apart and passing a lubricant between the pried open leaves.

Having thus described my invention, I claim as new and desire to secure by Letters Patent:

1. A leaf spring separator and lubricator, comprising a support, a prying member adjustably mounted on one end of the support, a nut on the other end of the support, a second prying member mounted to slide but not to turn on the support, a spring on the support between the prying members, a lubricant container carried by the sliding prying member, and a screw mounted in the nut and engaging the sliding prying member.

2. A leaf spring separator and lubricator, comprising a rod, a prying member on one end of the rod and having a V-shaped lip, a nut on the other end of the rod and having a guide arm projecting therefrom, a second prying member mounted to slide on the rod and having a hollow V-shaped lip, said prying member having a passage with which the hollow lip communicates and provided with a guide way receiving the guide arm of the nut, a lubricant container carried by the slidable prying member, and a screw mounted in the nut and engaging the said slidable prying member.

3. A leaf spring separator and lubricator, comprising a rod, a prying member adjustably secured to one end of the rod and having a V-shaped lip, a nut secured to the other end of the rod and having a guide arm extending therefrom, a second prying member slidably mounted on the rod and having a hollow V-shaped lip detachably secured thereto, said prying member having a passage with which the hollow lip communicates and provided with a guideway receiving the guide arm of the nut, a spring on the rod between the prying members, a lubricant container carried by the slidable prying member, and a screw mounted in the said nut and engaging the slidable prying member.

4. A lubricating device for lubricating leaf springs, comprising a support, prying members for prying adjacent leaves of the spring open, one of the said prying members being secured to the said support and the other being movable thereon, the said movable prying member being hollow, a lubricant container attached to the said movable hollow prying member and in communication therewith to pass a lubricant between the said open leaves, manually-controlled actuating means for moving the said movable prying member toward the said fixed prying member, and a spring on the said support and pressing the said movable hollow prying member to return the latter on retracting the said actuating means.

In testimony whereof I have signed my name to this specification in the presence of two subscribing witnesses.

PETER E. ERICKSON.

Witnesses:
ELSIE C. HARE,
HAZELNUT WELLSTOOD.